United States Patent [19]

Reil

[11] Patent Number: 5,059,108
[45] Date of Patent: Oct. 22, 1991

[54] INJECTION MOULD HAVING COOLING PASSAGES

[75] Inventor: Wilhelm Reil, Bensheim, Fed. Rep. of Germany

[73] Assignee: Tetra Pak Holdings & Finance S.A., Pully, Switzerland

[21] Appl. No.: 493,037

[22] Filed: Mar. 13, 1990

[30] Foreign Application Priority Data

Mar. 14, 1989 [DE] Fed. Rep. of Germany ....... 3908188

[51] Int. Cl.$^5$ ............................................. B29C 45/26
[52] U.S. Cl. ............................... 425/190; 425/192 R; 425/547; 425/552
[58] Field of Search ................. 425/190, 192 R, 547, 425/552

[56] References Cited

U.S. PATENT DOCUMENTS

| | | | |
|---|---|---|---|
| 4,001,471 | 1/1977 | Rumball | 428/60 |
| 4,462,780 | 7/1984 | Stavitsky et al. | 425/547 |
| 4,622,001 | 11/1986 | Bright et al. | 425/552 |
| 4,795,125 | 1/1989 | Boros et al. | 425/547 |
| 4,800,953 | 1/1989 | Veldhoff | 425/547 |

FOREIGN PATENT DOCUMENTS 2838634 9/1978 Fed. Rep. of Germany .
2941121 10/1979 Fed. Rep. of Germany .

OTHER PUBLICATIONS

"Mould Temperature Control", Plastics, Vol. 10, 1986, pp. 1284–1288, J. D. Robinson.
Article in Plastverarbeiter, H.12, 1967, S.8u.9; Pelka et al.

Primary Examiner—Timothy Heitbrink
Attorney, Agent, or Firm—Biebel & French

[57] ABSTRACT

A tool for the injection molding of synthetic plastics to form a plastic top on a paper tube container has an inner mold and a two-part outer mold in which two steel mold parts are adapted to be applied against each other in sealing-tight manner along a plane of separation and moved away from each other again. The injection molding cavity is formed by a surface contour attachment disposed on the mold parts. Cooling spaces are disposed behind the surface contour attachment on the side remote form the injection molding cavity.

9 Claims, 9 Drawing Sheets

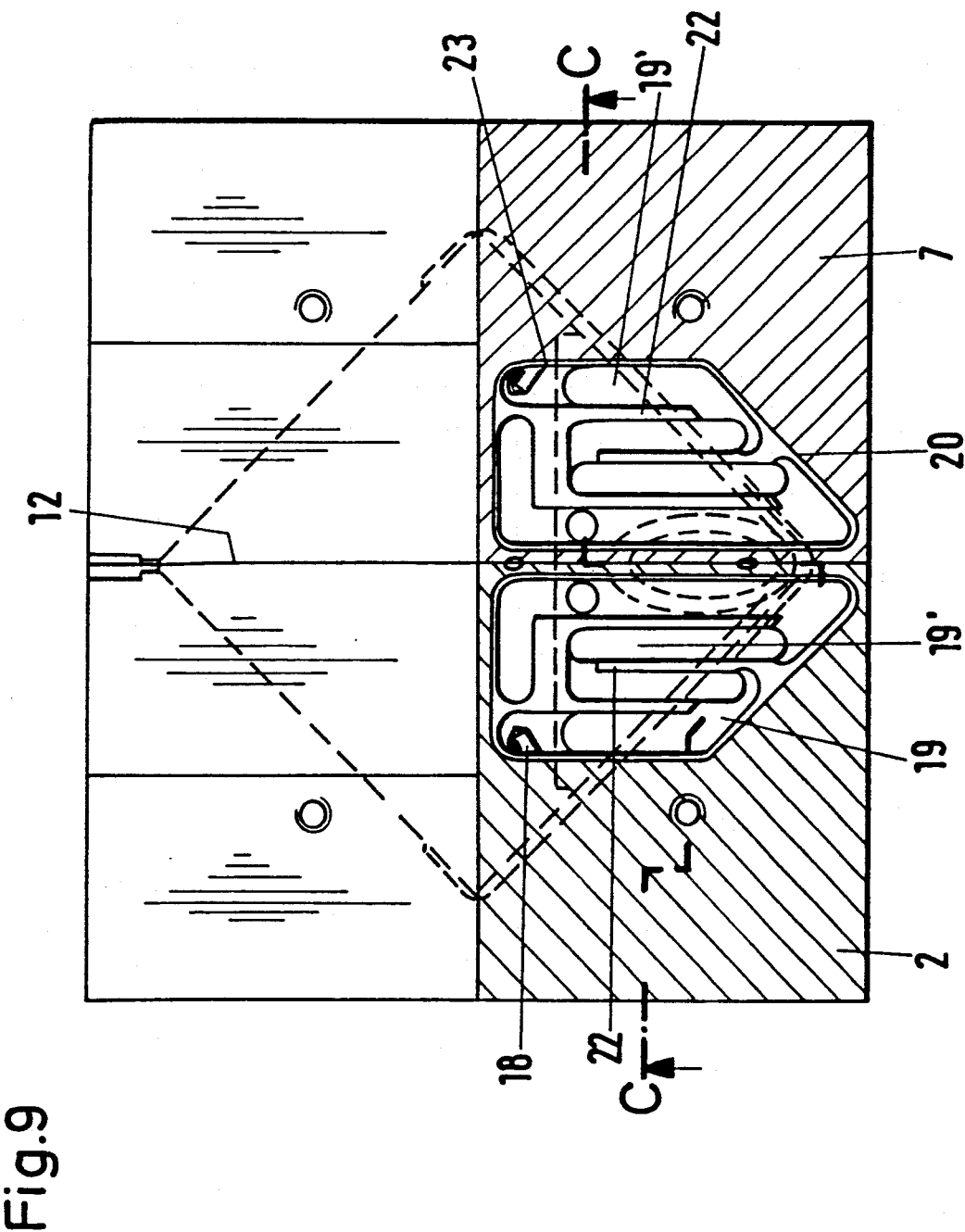

INJECTION MOULD HAVING COOLING PASSAGES

BACKGROUND OF THE INVENTION

The invention relates to a tool for the injection molding of synthetic plastics, with an inner mold and a two-part outer mold of which two substantially steel mold parts are adapted to be applied against each other in a sealingly tight manner along a plane of separation and moved away from each other again, said movements being brought about by control drives, the injection molding cavity being formed by a surface contour attachment disposed on the mold parts, cooling spaces being disposed behind the surface contour attachment on the side remote from the injection molding cavity.

For producing liquids packages, particularly for milk and juices (foodstuffs), it is already known for a top with a pourer orifice, and possibly already with a handle molded into place, to be injection molded onto a paper tube coated on both sides with synthetic plastics material because such liquids packages offer advantages to the manufacturer and also to the end user.

The injection molding of synthetic plastics tops into the paper tube takes place in the prior art paper producing machine by means of an inner mold which is constructed as a substantially cylindrical mandrel which, together with three other mandrels, is mounted on a mandrel wheel and is intermittently advanced during operation, one mandrel or one inner mold always being stopped during the injection molding process while, to form the injection molding cavity, two mold parts are moved together from outside so that they engage substantially at right-angles over the free end of the inner mold in such a way that they can be applied against each other in sealing-tight manner by corresponding control drives and pressed against each other and maintained in this position under pressure or possibly by other parts of the tool. The injection molding cavity formed in this way can be filled with the suitable synthetic plastics material under pressure so that the desired packaging part, e.g., the top or the top with an integrally cast handle, can be formed by injection molding.

From his practical experience, and from the literature concerning such injection molding machines, a man skilled in the art knows that the surface contour attachment is complicated and is comparatively expensive to produce, which is why especially the outer mold—and in this case each of the two mold parts—is expensive and should have a long effective life. But in the case of the two mold parts which form the outer mold, the stability on the one hand and the cooling on the other are important. Where injection molding is concerned, not inconsiderable pressures emanate from the synthetic plastics material in the injection molding cavity and they act outwardly on the boundary walls, namely the surface contour attachment. If the cooling spaces are too closely behind the surfaces which represent the surface contour attachment, then they can become deformed by the high pressure. For safety reasons, therefore, the cooling spaces are kept at a certain distance from the surfaces of the casting cavity. As the mold parts are made from steel, the heat conductivity from the cooling space disposed at a suitable distance from the surface contour attachment is, furthermore, limited. While it is possible to use milling tools on workpieces such as, for example, the mold parts, from outside (for instance, the complicated surface contour attachment), the cooling spaces are made by bores. It is a known fact, though, that bores cannot with any desired degree of accuracy be extended deep into the interior of a mold part. For this reason, too, it is advisable to keep the bores at a minimum safety distance from the surface contour attachment of the relevant mold part. The disposition of the cooling spaces in respect of the surface contour attachment on the one hand and the material of the steel mold part on the other lead to insufficient cooling, so that the output of the injection molding machines cannot be increased to the required extent.

A further drawback is the fact of general wear and tear in operation. Indeed, after a certain period of use, the entire mold part, together with its surface contour attachment, must be replaced by a new one in order to guarantee perfect moldings on the packages.

SUMMARY OF THE INVENTION

Therefore, the invention is based on the problem of so improving a tool for injection molding synthetic plastics and of the type mentioned at the outset that it is possible to improve the performance of package producing machines because cooling of the molding surface or of the surface contour attachment is improved, preferably combined with the possibility of also using more competitively priced tools for the injection molding cavity.

According to the invention, this problem is resolved in that the cooling spaces are bounded on at least one side by an insert which is fixed in fluid-tight manner in a recess in the relevant mold part. The cooling space or cooling spaces is or are according to the invention no longer formed by bores in the interior of the steel mold part but can be produced so that they can be accessible by a tool directly from an open side, because the open side is defined by an insert. The cooling spaces are either provided in the insert on one side or the insert provides an external closure of the cooling spaces disposed in the surface of the steel mold part. In the relevant mold part there is a recess in which the insert is fitted and, in fact, in a fluid-tight manner so that, for example, cooling water can flow, being fed to the cooling spaces and discharged therefrom through suitable passages. For example, a screwed fixing is possible. In other words, therefore, the insert is screwed to the mold part along with the cooling spaces.

It is particularly expedient if, according to the invention, on at least one of their sides, the cooling spaces are adjacent a plant surface and are connected to at least one cooling water passage. Thus, it is also possible to use milling to produce even a complicatedly constructed cooling space system because the milling tool is applied to the flat surface alongside the cooling spaces, whence it is able to engage the material. In the case of one embodiment, the cooling spaces are milled into the insert itself while, where the other is concerned, the cooling spaces are milled into the mold part and the plane surface of the then open side of the cooling spaces is masked by the insert. In this case, the entire surface of the cooling space system can be covered and can in consequence also be easily produced in advance. One or other of the embodiments will be chosen according to the stability demanded by the surface contour attachment involved.

For the invention, it is particularly advantageous if at least one surface of the insert mounted on the mold part and preferably consisting of a material with a greater heat conductivity coefficient than steel finishes flush with a part of the surfaces of the mold part. In addition to the above-mentioned advantage of the particularly easy production of cooling spaces and systems by milling, also the higher heat conductivity of the insert provides cooling advantages. In contrast to the bores which sometimes may go adrift and which have therefore been kept away at a safe distance from the surface contour attachment, milling out makes it possible to have access to all the spaces closely alongside the injection molding cavity, i.e., one comes close to the places which will subsequently be filled with synthetic plastics material and which require intensive cooling. A further advantage is that the surface contour attachment is understandably soonest abraded by wear and tear and if this is being used for the above-described embodiments of the first type, then it is necessary only to exchange the insert for a new one without having to replace the entire mold part. The insert itself is simpler and more economical. With the other form of embodiment, the cooling space system is indeed disposed in the steel of the mold part directly behind the surface contour attachment but the open back of the cooling spaces is masked by the insert which has a greater heat conductivity which ensures an even better dispersal of the heat absorbed by the cooling fluid.

According to the invention, it is also favorable for the insert to have an inner plane surface which, while defining the cooling space, bears in fluid-tight manner on the plane surface of the mold part which accommodates the same cooling space. This is the second of the two abovementioned alternative embodiments, namely the one in which the cooling space or spaces is/are milled into the mold part and in which the exposed side is masked in fluid-tight manner by the plane surface of the insert. The cooling space system may for example, consist of spirally or serpentinely extending grooves between which webs are left on the outer surface of which the insert is then supported, the said outer surface then forming the common plane surface. By reason of the smooth plane surface on which the insert is supported it is possible when producing the mold part to be able to apply the milling tools and to machine from the steel the desired pattern of cooling space grooves, bringing the cooling spaces to a point closely behind the surfaces of the surface contour attachment in the process.

With this embodiment, the insert acts as a plug or cover, a kind of closure for the recess in the relevant mold part or as a sealing-tight cover of the cooling space disposed underneath it and open prior to application of the insert. Whichever is the outer surface of the insert can end flush with the adjacent outer surface of the mold part.

According to the invention, in the case of a preferred embodiment, therefore, the cooling space is formed by grooves milled into the mold part and having webs disposed between them, the outer surface of the webs as well as the encircling edge of the grooves forming the plane surface of the mold part on which the insert rests.

However, it is also conceivable to have the other of the two above-mentioned alternative embodiments in which, in an expedient further development of the invention, the first form of embodiment is characterized in that the insert which is mounted without clearance in the mold part comprises an inner plane surface starting from which at least one cooling space extends into the material of the insert and in that the insert has opposite it an outer plane surface which forms a part of the plane of separation of the mold part and which comprises the surface contour attachment of the injection molding cavity. With this embodiment, the outer flat surface is expediently flush with the adjacent surface of the mold part, because the whole surface extending over both parts (insert and mold part) lies at the plane of separation of the two-part injection molding tool (the two mold parts). It will be understood that the surface contour attachment of the injection molding cavity has been machined out of this part of the outer plane surface, preferably by milling. In the case of the aforementioned embodiment, whereas the cooling spaces were cut into the steel, where this embodiment is concerned, it is the material of the insert into which the milling cut is made. For example, if the insert consists of aluminum, then the surface of the contour attachment is also an aluminum surface. In other words, the injection molding cavity is formed on both sides by the aluminum inserts. It goes without saying, however, that also other readily heat conductive materials are feasible, preferably metals due to their stability.

Common to both embodiments is the ready potential for providing the cooling space or spaces in order to achieve a favorable cooling effect and in order to bring the cooling fluid as close as possible to the molding surfaces, i.e., to the surface contour attachment, in order to dissipate the heat from this attachment. By this means, it is however possible to increase the efficiency of the package producing machine because the cooling of the outer mold consisting of two mold parts is more rapidly possible by the measures according to the invention with the result of increased output from the machine equipped with this injection molding tool.

Also the preferred embodiment described here can preferably be so constructed that the cooling space is formed by grooves milled into the insert and having webs between them, the outer surface of the webs and of the encircling edge of the grooves forming the inner plane surface of the insert via which the insert can be pressed in fluid-tight manner against the plane surface of the recess in the mold part. While in the case of the previously described embodiment, the insert has like a cover or plug closing off the grooves in the steel body and may possibly have flat surfaces on a pluralize of sides, in the case of the embodiment described here, the insert may have on one side the surface contour attachment for forming the injection molding cavity and on the opposite side the cooling system, preferably by grooves with interposed webs. Here, in plan view, the webs can have all manner of shapes when looking down onto this inner plane surface, for example they may be trapezoidal, circular, oval, elongated or the like. In any event, they constitute the support of the insert on the plane surface of the recess in the mold part so that also the surface contour attachment is supported by the mold part. It will be appreciated that, despite an insert, a tool has been provided which is capable of satisfying the most exacting demands.

Furthermore, a particular advantageous embodiment of the invention is characterized in that the insert is constructed as a substantially trapezoidal plate which, together with the plate of the other mold part and which is constructed in a mirror symmetrical form in relation to the plane of separation, substantially covers one half of the injection molding cavity from at least one side. Where relatively small injection molding cavities are concerned, then these may be formed completely and masked by two of these mirror-symmetrically constructed plates. If, for example, however, an injection molding cavity is involved, of which one part constitutes the top and the other part a handle injection molded on the top, or the space for the synthetic plastics material which forms these parts, then often a pair of inserts will not be sufficient and then two pairs of inserts will have to be disposed in the appropriate position in respect of each other. It has been demonstrated that the volume of synthetic plastics material to be cooled and also, in the final analysis, the top of a liquids package, are flat and thin spaces so that a cooling space system disposed behind the surface contour attachment ought to mask this flat fin injection molding cavity virtually completely. In the case of tops of liquids packagings in package producing machines, it is expedient for the insert to be of trapezoidal construction, particularly with such a type of packing where it is intended at the same time for the handle of synthetic plastics material to be injection molded onto the paper tube at the same time as the top of synthetic plastics material is molded into place. The handle is at a distance of, for example, 1 to 3 and preferably 2 cm away from the tube material, i.e., from the paper, so that in the side view of the handle the entire area forming the handle is at best covered by a trapezoidal panel. If according to the preceding proposal a pair of inserts are used, i.e., a pair of trapezoidal plates, then the injection molding cavity for the handle is substantially covered and in this case this essentially means one half of the injection molding cavity.

In the case of a preferred tool of a very expedient embodiment of the invention, the pair of inserts of trapezoidal form which have just been described can be so disposed that the trapezoidal form seems to the observer viewing in a direction at right-angles to the plane of separation between the two mold parts, whereas for essential parts of the top which is to be injection molded onto the handle, particularly in conjunction with the pourer orifice of the top, is covered by another pair of inserts, the form of which may be likewise substantially trapezoidal, in which case however the trapezoidal form appears to the viewer who is looking in a direction at right-angles to the top, i.e., in the direction of the plane of separation and in the direction of the longitudinal axis of the paper tube. This pair of inserts in the region of the pourer orifice of the opening device on the top is therefore adjacently disposed, there being no need for one insert of the last-mentioned pair to touch the other. Both inserts are disposed beside each other and once again they do not cover the essential parts of that surface of the top which has to be cooled.

According to the invention, it is furthermore advantageous if the cooling space occupies a substantial part of the insert and if web-like supporting parts are disposed in the cooling space. With regard to the material of the insert, therefore, the volume of the cooling space is considerable, so that a very high cooling effect is achieved. The cooling space is interrupted by web-like supporting parts and thus the insert acquires a high mechanical stability. Therefore, although there is behind the entire surface contour structure in the region of the insert a large surface of a cooling space system, nevertheless high injection pressures can occur in the injection molding cavity without the insert being damaged and without the mold surfaces being distorted.

The increased output from a package producing machine is the surprising outcome of the measures according to the invention, because simple means have been able to overcome bottlenecks in the cooling time of the outer mold of the injection molding tool. At the same time, the cooling space system can be very expediently equipped with milling tools and the cooling spaces can be extended to a point quite close to the critical cavities for injection molding, resulting in satisfactory heat dissipation and effective cooling of the injection molding cavity. By a suitable choice of insert material, it is possible to increase heat conductivity and so further enhance the cooling effect. Also the economy of the injection tool can be improved in this way because the part which is mostly subject to wear and tear is the actual injection mold which is here constituted at least partially by an insert. After the appropriate and conventional wear and tear, the measures according to the invention mean that it is necessary only to change an insert and replace it by a new one, however with no need to exchange the entire injection molding tool.

Therefore, according to the invention, it is advantageous to use the tool of the afore-described type for the integral molding of top and/or bottom with or without handle on the paper tube of a liquids package.

Further advantages, features and possible applications of the present invention will emerge from the ensuing description of preferred examples of embodiment in conjunction with the attached drawings, in which:

BRIEF DESCRIPTION OF ACCOMPANYING DRAWINGS

FIG. 9 is a partially sectional plan view of the mold part similar to FIG. 2, but where the cooling space systems can be seen in the region of the top with the pourer device.

DESCRIPTION OF PREFERRED EMBODIMENTS

Figure 1:
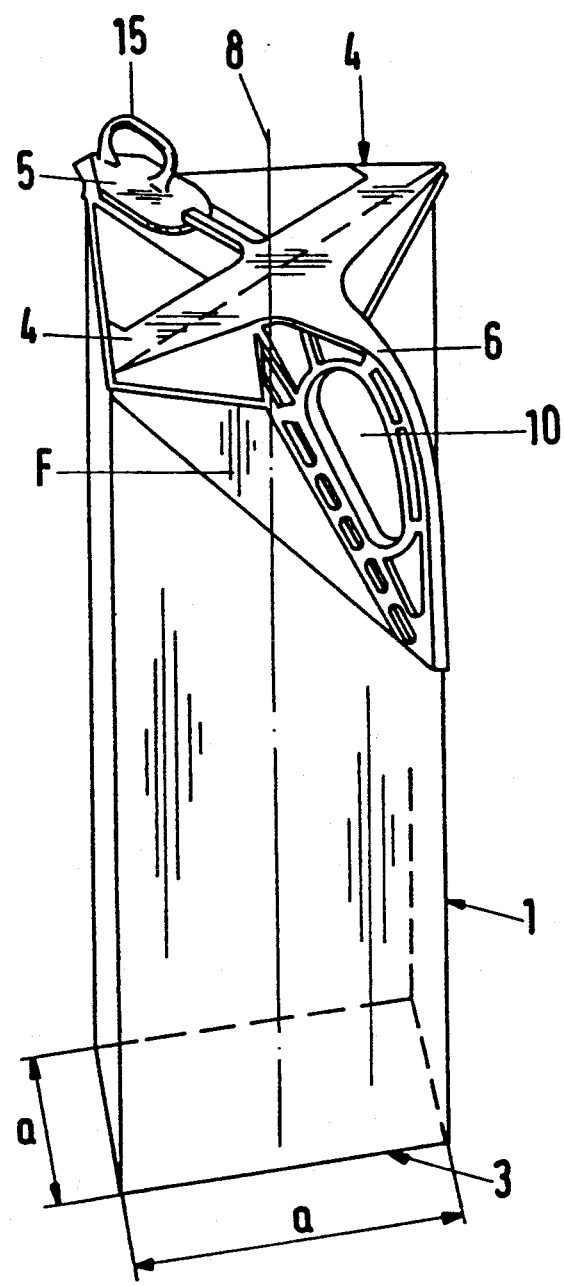
FIG. 1 is a perspective view of a preferred embodiment of liquids package with top and integrally cast handle to illustrate the end product which it is intended to produce by using the injection molding tool which is to be described.

FIG. 1 shows a perspective view of the product of the package producing machine, i.e., the package itself, in order to improve understanding of the injection molding cavity which is to be described hereinafter and also an appreciation of the other parts of the tool. The package shown in FIG. 1 consists of a paper tube 1 of quadratic cross-section, its bottom edge 3 having a width a and a length a so that in other words it forms a square. At the other end of the tube 1 is the top generally designated 4 which consists of synthetic plastics material and which is injection molded onto the synthetic plastics coated paper material of the tube 1. Together with the top 4, its opening device 5 is injection molded together with its tear-open strip 15 and on the opposite side the handle 6 with the gripper opening 10. It will be seen that the surface F which consists of paper is alongside the handle 6 at an angle to the plane of the top 4. The longitudinal central axis through the package and the tube 1, extending at right-angles through the plane of the top 4, is shown in dashdotted lines and is identified by reference numeral 8.

With regard to the cooling of injected plastics material, the part of the handle 6 which is remote from the triangular area F is particularly critical because the synthetic plastics material supports itself and is not injection molded on paper surfaces as is the case in the region of the top 4.

The manufacturer of the injection molding tools for the top 4 with handle 6 according to the package shown in FIG. 1 has set himself the task of especially cooling the injection molding cavity for the handle 6 but also providing improved cooling for the top 4 with the opening device 5 and the tear-open strip 15.

Figure 2:
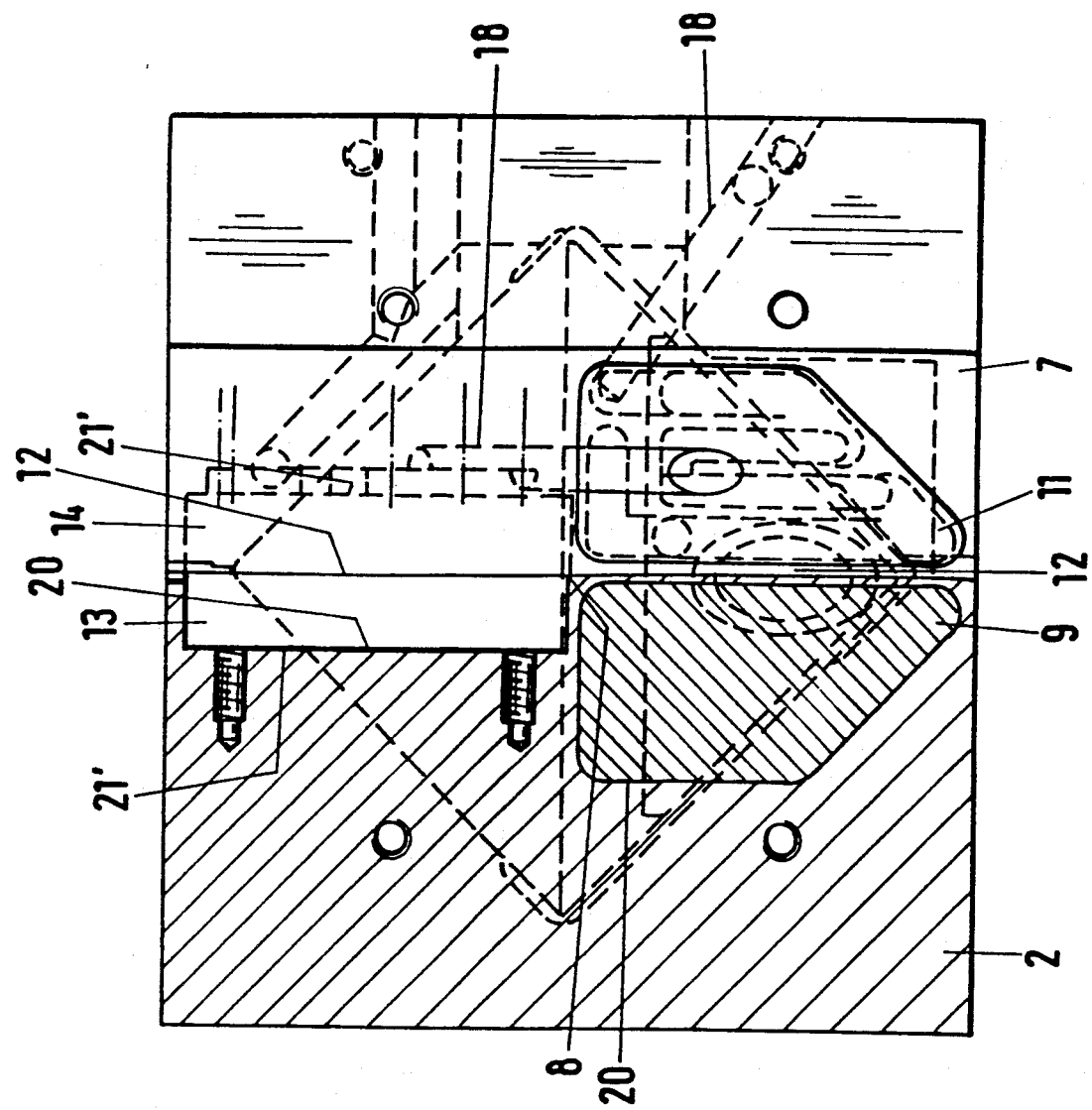
FIG. 2 is a plan view of two mold parts with inserts which are substantially mirrored in their construction in respect of the middle plane of separation.
Figure 3:
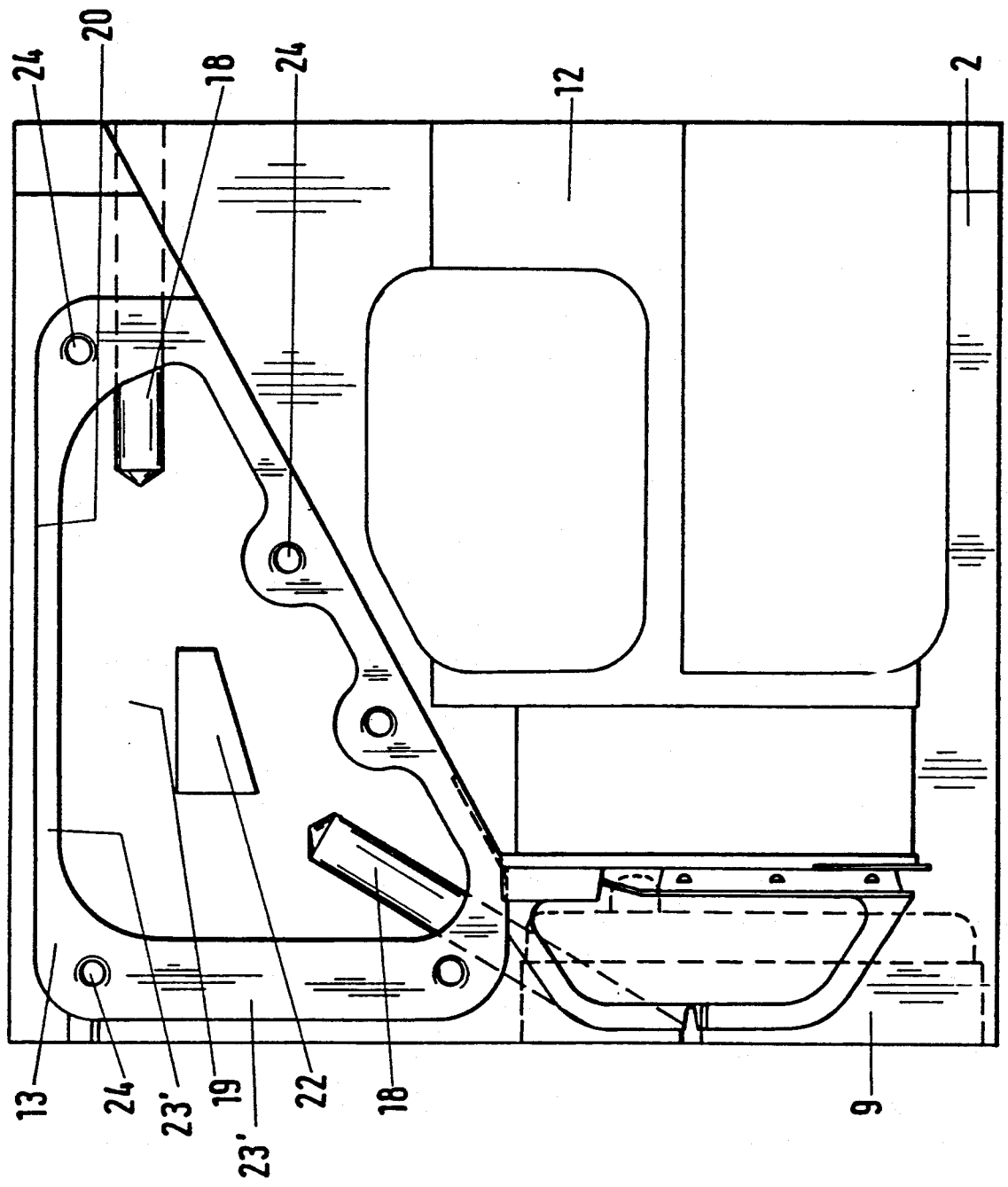
FIG. 3 is a side view of the left-hand mold part in FIG. 2, for example if the right-hand mold part is removed and if one is looking at the plane of separation.
Figure 4:
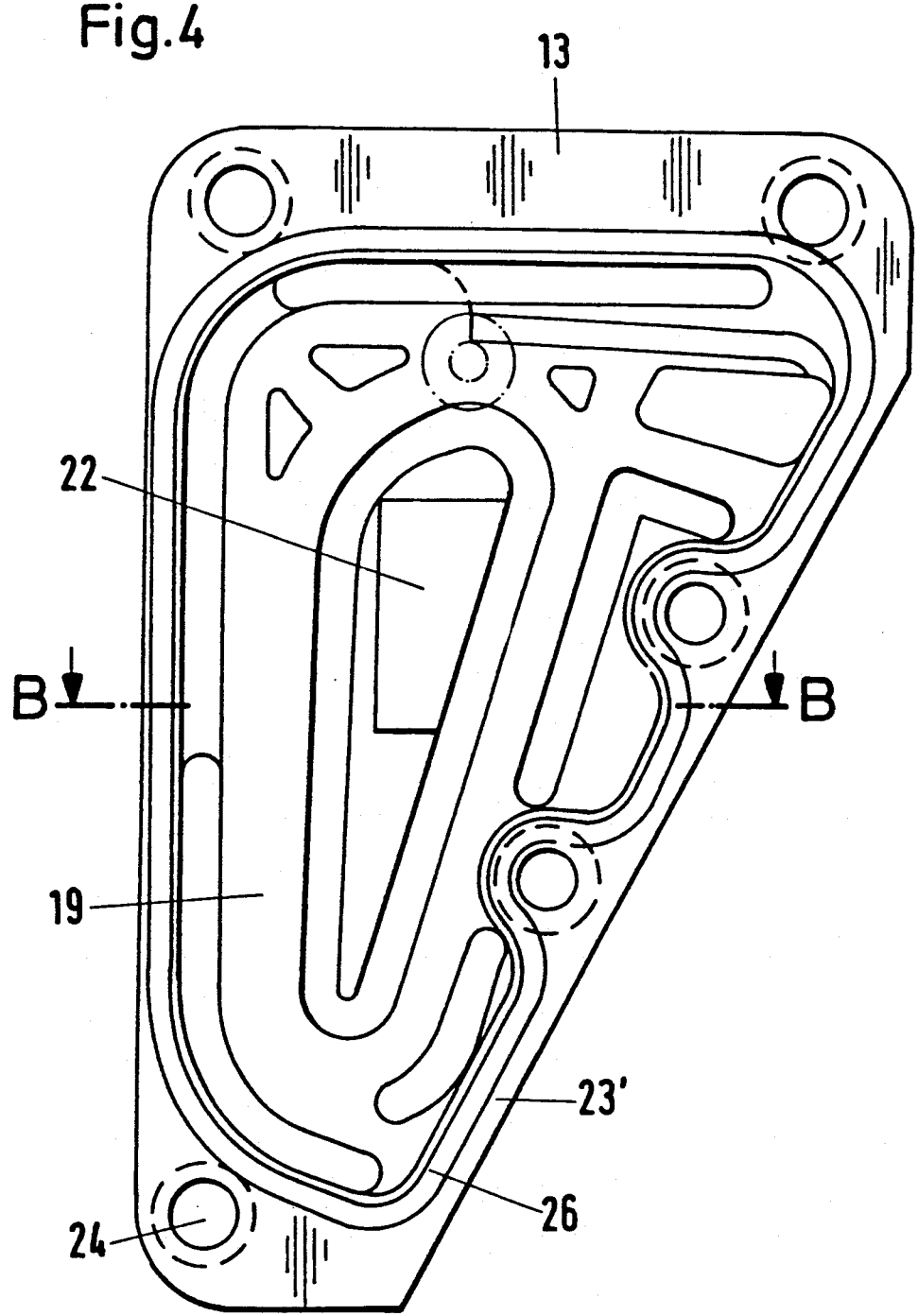
FIG. 4 shows the insert in the region of the handle and viewed from the same side as the cooling space.
Figure 6:
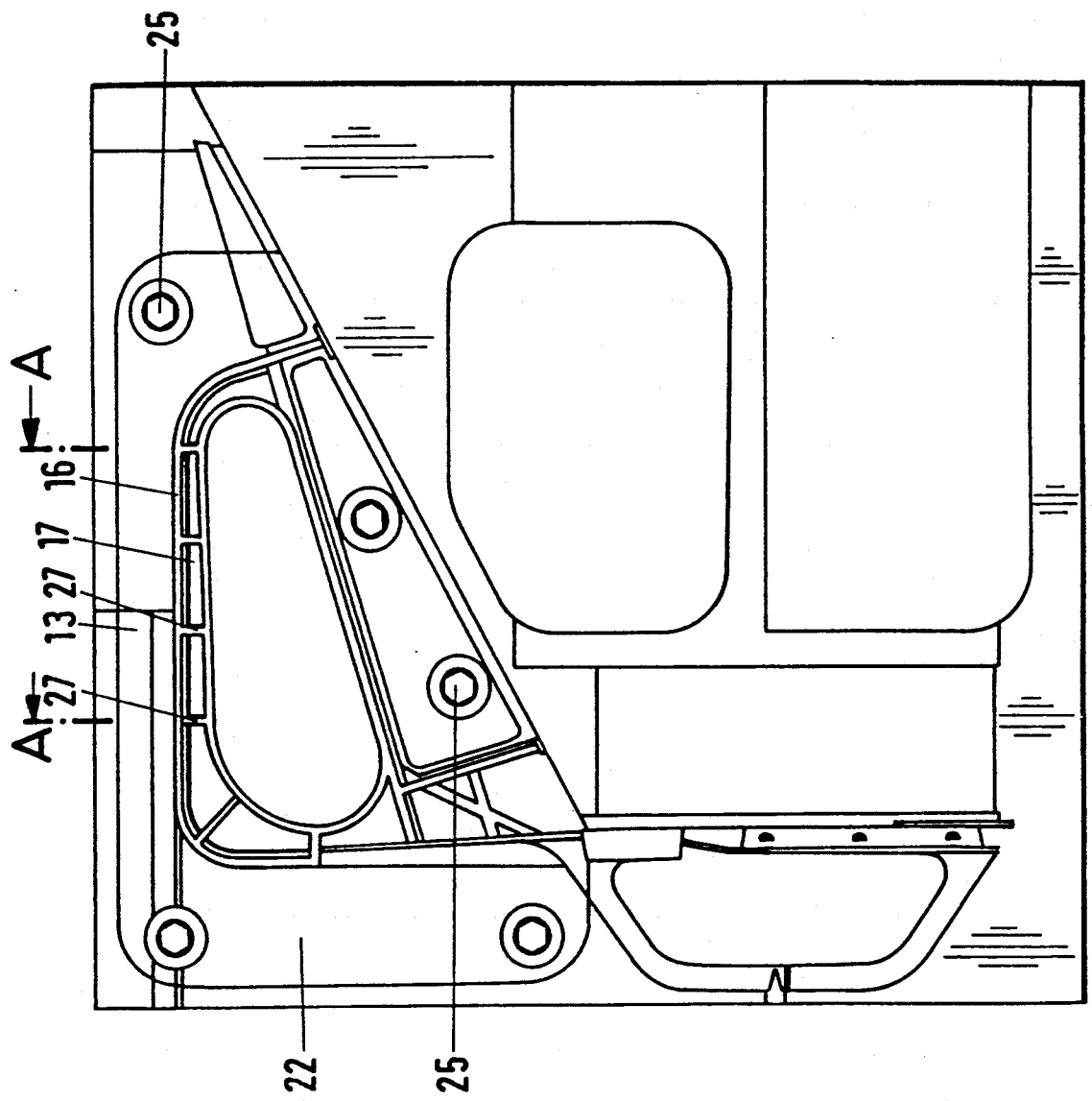
FIG. 6 is the other view of the insert and in fact, with regard to FIG. 4, it is seen from the opposite side and shows the surface contour attachment.

Therefore, FIG. 2 shows a plan view of the mold parts 2 and 7 and the first pair of inserts 9 and 11 of trapezoidal form viewed in the direction of the longitudinal central axis 8 through which passes the plane of separation 12 and the second pair of inserts 13 and 14, the trapezoidal form of which is shown by FIGS. 3, 4 and 6 in a view at right-angles to the plane of separation 12.

Therefore, the outer form of the injection molding tool consists of the two mold parts 2 and 7. FIGS. 2, 8 and 9 show how the mold parts 2 and 7 are pressed against each other in sealing-tight manner under pressure along the plane of separation 12 by control drives, not shown. The result is an injection casting cavity 16 which can be only partially seen in FIGS. 6 and 7. In the other views one looks mostly at the surface contour attachment 17, the matching contour attachment of the inner mandrel lacking because it is not shown. For example, the right-hand half of the sectional view in FIG. 8 shows a cavity under the surface contour attachment 17 into which the inner mandrel not shown can be introduced. The injection molding cavity 16 is then, in FIG. 8, in the bottom right-hand corner adjacent the underside of the line which constitutes the surface contour attachment 17.

Whereas with conventional tools the cooling spaces can only be formed by bores, as shown here with the construction of cooling water passages 18 according to the invention and which, in the case of the embodiment shown here, provide only for the supply and discharge of cooling water, the cooling space is or the cooling spaces 19 are cut into place.

Two different forms of embodiment of inserts 9, 11 on the one hand and 13, 14 on the other will be described in greater detail hereinafter, FIGS. 2, 8 and 9 referring to the inserts 9, 11 for better cooling of the top 4 with pourer device 5 while the pair of inserts 13 and 14 will be explained with reference to FIGS. 2 to 7, and in this case cooling in the region of the handle 6 will be be explained with reference to FIGS. 2 to 7, and in this case cooling in the region of the handle 6 will be discussed.

Common to both embodiments of insert is in each case the recess 20 in the mold part 9, 11 or 13, 14. Where both types of insert 9, 11; 13, 14 are concerned, the cooling spaces are adjacent a plane surface and in fact, in the case of embodiment of inserts 9 and 11, they are adjacent the plane surface 21 while in the case of the inserts 13, 14 they are adjacent the plane surface 21', which is at the same time the bottom surface of the recess 20 in the insert 13 or 14.

With regard to the plan view in FIG. 6 showing the injection molding cavity 16, the viewer is for practical purposes looking at the outer surface 22 of the insert 13 in which, of course, the surface attachment 17 is formed. This surface 22 of the insert 13 or 14 which is to be mounted on the mold part 2, 7 is flush with a part of the surface 12 of the mold part 2, 7, because this surface 12 of the mold part is at the same time the plane of separation 12.

A different situation applies in the case of the embodiment of inserts 9, 11 which will now be described in greater detail particularly with regard to FIGS. 8 and 9.

The preferably aluminum insert 9 or 11 has an inner plane surface designated 21 because it coincides with the plane surface adjacent to which are the cooling spaces 19. At the same time, this is also the plane surface of the mold part 2 or 7. Particularly in the plan view in FIG. 9 in which the inserts 9 and 11 do not appear, it is possible to see how meandering grooves 19, have been cut into the steel of the mold part 2 and also 7, webs 22 being left between them which, together with the encircling edge 23 of the grooves 19, constitute the aforementioned plane supporting surface 21. The insert 9, 11 also bears on this in fluid-tight manner.

In FIG. 1, if one looks from the top left-hand corner onto the pourer point of the opening device 5, then the corresponding view is shown in FIG. 8 in respect of the tool for the top. The upper middle point of the two mold parts 2 and 7 lies close to the top of the opening device 5 which is shown by broken lines in FIG. 9. One can see how the trapezoidal surface, the tip of which is in each case opposite the other surface of the pair of inserts masks the critical surface which has to be cooled. FIG. 8 shows how closely the cooling space 19 or the grooves 19' are to the mold surface which is, of course, the surface contour attachment 17.

In operation, cooling fluid can be passed through the cooling water passages 18 in either direction and can flow through the grooves 19' as if through passages so that the heat created by injection of the synthetic plastics material is rapidly dispersed and the synthetic plastics material is sufficiently hardened in a short time. When the top and handle have hardened sufficiently, the two mold parts 2 and 7 can move apart jointly with the inserts 9 and 11 mounted on them, the movement being symmetrical in relation to the plane of separation 12, the package then being capable of being twisted out sideways, for example upwards or downwards in the direction of the plane of separation 12 as shown in FIGS. 2 and 9.

The other embodiment of insets 13 and 14 can be seen mainly in FIGS. 2 to 7. The cooling space in FIG. 3 is of large area and has, for example, in the middle a trapezoidal supporting surface which for the sake of uniform identification is here designated as being the web 22, although no exact web form is present. Such a supporting member as the body shown at 22 in FIGS. 3 and 4 may also have different outer contours and may, for example, be circular, oval, angular or the like. For reasons of stability and to accommodate the high peak pressures, it is expedient, in addition to the central web 22, also to provide further pressure absorbing webs not shown here in greater detail. These webs 22 extend from the bottom of the cooling space 19, i.e., as seen in FIG. 2, from the surface 20 or 21' to the height of the plane of separation 12.

Figure 5:
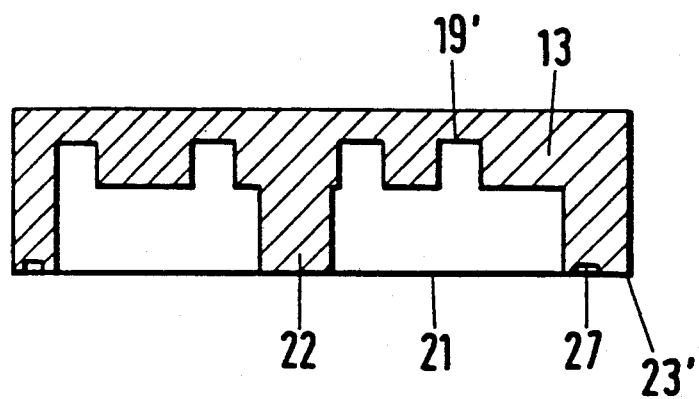
FIG. 5 shows a sectional view taken on the line B—B in FIG. 4.

Looking onto the plane of separation 12, the trapezoidal form is clearly manifest to anyone looking at FIGS. 3, 4 and 6. Accordingly, the encircling edge 23' around this insert 13 or 14 is also trapezoidal. It is particularly thick at the fixing bores 24. FIG. 6 already shows the anchoring bolts 25 which extend through the fixing bores 24 in the encircling edge 23'. FIG. 4 also shows a sealing cord 26 which should be inserted into a groove 27 which is shown in FIG. 5 so that the insert 13 or 14 can be disposed in fluid-tight manner on the bottom of the recess 20 in the mold part 2, 7. Only then can cooling water be introduced as required during operation into the cooling space 19 and dispersed again, for example at the opposite side, without adversely affecting peak operation. It is a good idea if, as shown in FIG. 4, the sealing cord 26 leaves or extends within all the fixing bores 24 in the encircling edge 23'.

Figure 7:
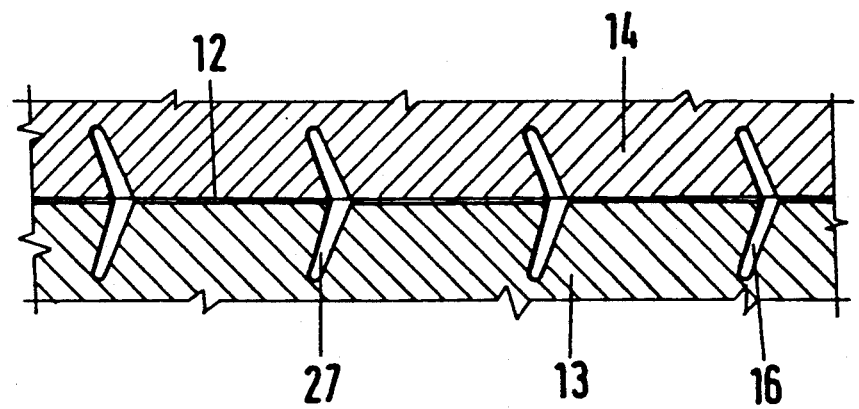
FIG. 7 is a sectional view taken on the line A—A in FIG. 6.
Figure 8:
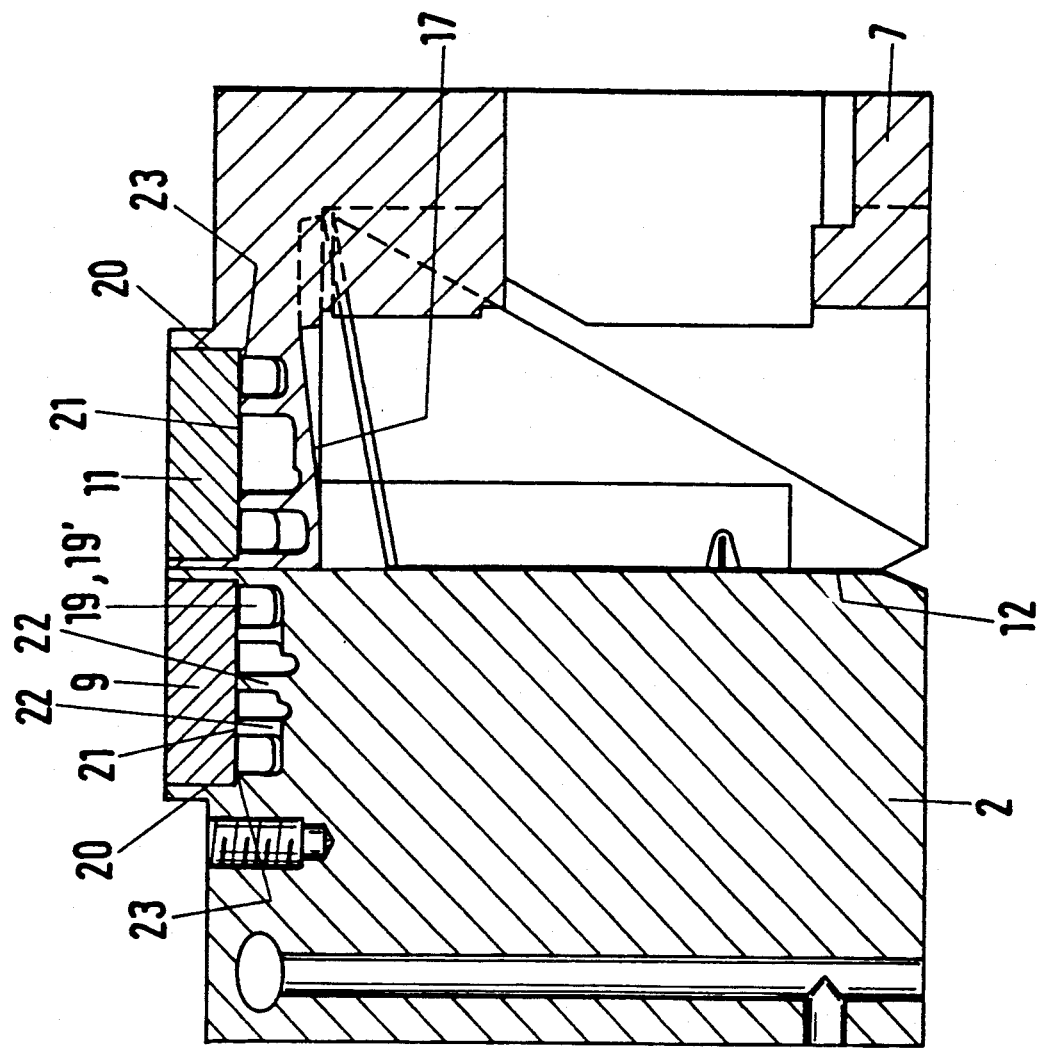
FIG. 8 shows in two different sectional views the mold parts when one is looking upwards in respect of FIG. 2, the section having been taken on the line C—C in FIG. 9.

From the large cooling space 19 shown in FIGS. 4 and 5, in order to be able to come close to the particularly critical points and as close as possible to the mold surface or surface contour attachment 17 of the injection cavity 16, the embodiments shown in FIGS. 5 to 7 additionally have milled into them grooves 19' so that the distance from the bottom of these grooves 19' to the surface contour attachment 17 is so small that heat is readily dissipated from the injection molding cavity 16, particularly since the insert 13 or 14 is made from a readily heat conductive material, e.g., aluminum.

FIG. 6 shows a plan view of the (in respect of FIG. 4) other side of the insert 13, in fact looking at the surface contour attachment 17. It is possible to see an injection molding cavity 16 which, after being filled with synthetic plastics material, hardening out and removal of the tool, corresponds substantially to the handle 6 of the package in FIG. 1. In the case of the special embodiment, it must produce this handle exactly.

FIG. 7 clearly shows on both sides of the plane of separation 12 the way in which for better mold removal no ribs 27 are provided on the handle 6 as a stiffening means and how none are therefore provided in the tool according to FIG. 6.

In operation, the inserts 9, 11 and 13, 14 are screwed onto the relevant mold half 2, 7, the cooling water passages 18 are closed and then cooling water flows through all the cooling spaces 19. Especially the wearing parts 13 and 14 can easily be exchanged.

What is claimed is:

1. In a tool for injection moulding of synthetic plastics material comprising a two part mould, said two part mould formed by two substantially steel mould parts adapted to be applied against each other in sealing-tight manner along a plane of separation and moved away from each other, the improvement comprising means in at least one of said mould parts defining a recess, at least one insert received in said one mould part recess and fixed therein in a fluid-tight manner, means in an exposed surface of said at least one insert defining a mould cavity, said at least one being formed of a metal material having a greater heat conductivity coefficient that steel, and cooling spaces disposed in the interface between said at least one insert and said one mould part recess, said cooling spaces being bounded by said at least one insert and said one mould part.

2. A tool according to claim 1 wherein said at least one insert is formed with an inner plane surface from which at least one said tooling space extends into the material of said at least one insert and said insert has an outer plane surface which forms a part of said plane of separation of said mould part.

3. A tool according to claim 1 wherein the cooling spaces occupy a considerable part of said at least one insert and bracing parts being disposed in said cooling spaces.

4. A tool according to claim 1 in which said cooling spaces are formed by grooves cut into said one mould part, said grooves defining webs therebetween, said grooves having an encircling edge forming a flat surface of said one mould part engaging said at least one insert.

5. A tool according to claim 1 further comprising means in the other said mould part defining a second recess, a second said insert received in said second recess, each of said inserts being constructed as a substantially trapezoidal plate, each of said plates having a part of a mould cavity therein which is mirrored symmetrical in relation to the cavity part in the other said plate at the plane of separation.

6. In a tool for injection moulding of synthetic plastics material including a pair of mould parts adapted to be applied against each other in sealing-tight manner along mutually abutting faces at a plane of separation and moved away from each other, the improvement comprising said mould parts including recesses formed in said abutting faces and adjacent to said plane of separation, said mould parts having cooling passages opening into said recesses, and mould inserts received in said recesses in sealing tight engagement with said mould parts, said inserts being formed material having a greater heat conductivity coefficient than that of said mould parts, and means in said inserts at said plane of separation defining an injection moulding cavity.

7. The tool of claim 6, wherein said cooling passages are in communication with cooling channels in said mould parts positioned behind said inserts.

8. The tool of claim 7, wherein said recesses have outwardly directed faces and said cooling passages are defined on said outwardly directed faces.

9. The tool of claim 7, wherein said inserts have inwardly directed faces and said channels are formed on said inwardly directed faces.

* * * * *